United States Patent
Kang (10) Patent No.: US 12,053,913 B2
(45) Date of Patent: Aug. 6, 2024

(54) FOAM MOLDING APPARATUS AND FOAM MOLDING METHOD THEREBY

(71) Applicant: etat'H solide, Anyang-si (KR)

(72) Inventor: Myung Ho Kang, Seoul (KR)

(73) Assignee: etat'H solide, Anyang-si (KR)

( * ) Notice: Subject to any disclaimer, the term of this patent is extended or adjusted under 35 U.S.C. 154(b) by 30 days.

(21) Appl. No.: 17/634,417

(22) PCT Filed: Aug. 5, 2020

(86) PCT No.: PCT/KR2020/010295
§ 371 (c)(1),
(2) Date: Feb. 10, 2022

(87) PCT Pub. No.: WO2021/029594
PCT Pub. Date: Feb. 18, 2021

(65) Prior Publication Data
US 2022/0314505 A1    Oct. 6, 2022

(30) Foreign Application Priority Data
Aug. 13, 2019    (KR) .......................... 10-2019-0099003

(51) Int. Cl.
  *B29C 44/50*    (2006.01)
  *B29C 44/34*    (2006.01)
  *B29K 105/00*    (2006.01)

(52) U.S. Cl.
  CPC .......... *B29C 44/50* (2013.01); *B29C 44/3415* (2013.01); *B29C 44/3449* (2013.01); *B29K 2105/0073* (2013.01)

(58) Field of Classification Search
  CPC . B29C 44/3449; B29C 44/50; B29C 44/3415; B29C 44/0492; B29C 44/3442;
  (Continued)

(56) References Cited

U.S. PATENT DOCUMENTS

2008/0290543 A1* 11/2008 Okamoto .............. B29C 44/586
264/55

FOREIGN PATENT DOCUMENTS

EP         2033758 A1 *  3/2009  ......... B29C 44/3446
JP      2011-098518 A     5/2011
(Continued)

OTHER PUBLICATIONS

English translation of EP-2033758-A1 retrieved from Espacenet (Year: 2023).*

*Primary Examiner* — Francisco W Tschen
*Assistant Examiner* — Elisa H Vera
(74) *Attorney, Agent, or Firm* — KORUS Patent, LLC; Seong Il Jeong (57) ABSTRACT

A foam molding apparatus and a foam molding method thereby are proposed. The foam molding apparatus includes a foaming agent supply unit configured to supply a foaming agent, a molten resin supply unit configured to supply molten resin, a fixed mixing unit configured to produce a foaming resin-critical solution by mixing a foaming agent supplied from the foaming agent supply unit and molten resin supplied from the molten resin supply unit through a rod-shaped body, and a molding unit configured to mold a foam molding product using the foaming resin-critical solution supplied from the fixed mixing unit. Accordingly, it is possible to produce a foaming resin-critical solution by uniformly mixing a large amount of high-viscosity gel-state molten resin and a high-pressure compressed and low-viscosity foaming agent, using high-strength multiple channels.

11 Claims, 10 Drawing Sheets

(58) Field of Classification Search
CPC .............. B29C 2045/466; B29C 45/46; B29C 48/0012; B29C 44/3446; B29K 2105/0073; B29B 7/325; B29B 7/7419
See application file for complete search history.

(56) References Cited

FOREIGN PATENT DOCUMENTS

| KR | 10-0550528 B1 | 2/2006 |
| KR | 10-2012-006114 A | 6/2012 |
| KR | 10-2018-0034995 A | 4/2018 |
| KR | 10-2019-0031118 A | 3/2019 |

* cited by examiner

FOAM MOLDING APPARATUS AND FOAM MOLDING METHOD THEREBY

TECHNICAL FIELD

The present disclosure relates to a foam molding apparatus and a foam molding method thereby and, more particularly, to a foam molding apparatus that manufacture an ultra-light and high-strength foam molding product by manufacturing a ultra-low specific-weight foam molding product such that foam cannot be formed on the surface of the ultra-low specific-weight foam molding product, and a foam molding method thereby.

BACKGROUND ART

Molding of synthetic resin is a method of obtaining a cavity-shaped molding product usually by injecting and cooling molten synthetic resin or metal in between a fixed mold having a cavity (a cavity mold) and a movable mold having a core (a core mold). Such molding, which is a process of manufacturing a product usually by injecting molten resin into a mold having a predetermined shape and then compressing the resin at high temperature and high pressure, is used for molding of thermoplastic resin in most cases.

However, molding that is performed without a fixed mold closed by a movable mold, that is, profile molding obtains a molding product by injecting molten resin, etc. into a mold while moving a nozzle for injecting molten resin with respect to a fixed mold such as 3D printing or while moving a mold with respect to a fixed nozzle, whereby the mold cost can be considerably decreased and extra-large products can be manufactured through molding.

Figure 1:
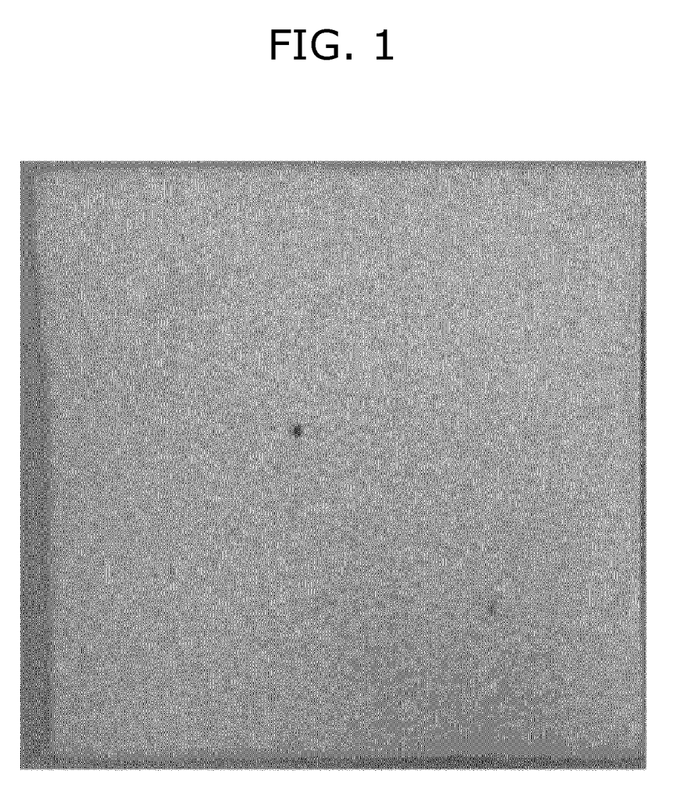
FIG. 1 is an exemplary picture of a foam molding product manufactured through foam molding by mixing a foaming agent in molten resin using a stirring-type mixing method of the related art.

Meanwhile, a method of manufacturing a foamed molding using a chemical foaming agent or carbon dioxide and nitrogen, etc. is being recently attempted to reduce the weight of a molding and manufacture products having the same shape. However, according to this case, for example, as proposed by an injection mold apparatus and a manufacturing method for a foam resin product in Korean Patent Application Publication No. 10-2012-0029599, resin and a foaming agent are stirred and mixed by rotary blades. Accordingly, the foaming ratio is 1.5 at the most due to limitation related to injection of a foaming agent in molten resin including limitation in position or number of foaming agent injection inlets, and the specific weight of moldings is minimum 0.7 or more, so it is impossible to manufacture a low specific-weight molding product through the current technology. Further, there is a problem that since the surface of such a foam molding product is rough, as shown in FIG. 1, the aesthetic appearance is deteriorated and the foam molding product can be substantially used only when surface treatment such as painting is performed.

In other words, in order to increase the foaming ratio when manufacturing a foam molding product, it is required to uniformly mix a liquid foaming agent compressed at high pressure with molten resin and to increase the content of the foaming agent. However, it is very difficult to mix high-viscosity viscoelastic molten resin pressed at high pressure and a foaming agent liquefied at high temperature and having very low viscosity like gas in a case heated at high temperature of about 200° C. A spiral screw is used to knead molten resin in an injection device case in the related art. In this case, a method of forming a channel that can inject a compressed liquid foaming agent into a screw, of injecting a liquid foaming agent through the channel, of mixing molten resin and the liquid foaming agent by rotating the screw, and of injecting a foaming resin mixture, which flow in the front end of the screw, into a cavity of an injection mold by moving forward the screw under high pressure using hydraulic pressure or electricity is used. Accordingly, it is difficult to produce a completely uniform compound by mixing molten resin and a foaming agent, which are different in phase and have a large viscosity difference, using rotation of a screw in a pressurized atmosphere. Further, in order to produce molten resin manufactured in this way, it is required to maintain a sealed high-pressure atmosphere so that molten resin does not leak outside. Accordingly, it is impossible to inject a sufficient amount of liquid foaming agent within a short movement distance, considering the durability and sealing ability. Accordingly, the foaming ratio of the final foam molding product remains at a very low level. Further, in a foam molding product manufactured in this way, most foaming apertures are exposed to the surface and the foaming apertures exist very little at the center portion. Therefore, there is a problem that the surface of a foam molding product is very rough, post-machining of the surface is difficult, and the external appearance is not aesthetic, so the foam molding product cannot be used as an external product.

DISCLOSURE

Technical Problem

The present disclosure has been made in an effort to solve the problems of such a foam molding apparatus of the related art and an objective of the present disclosure is to reduce the specific weight of a foam molding product, for example, to 0.8 g/cm$^2$ by increasing the density of a foaming space when a foaming agent compressed at high pressure, such as liquefied carbon dioxide, liquefied nitrogen, water, or steam, expands in a foaming part such as a mold by mixing the foaming agent in the foam molding product as much as possible through a process for mixing the foaming agent as much as possible with molten resin before injecting the foaming agent in a molding part such as a mold.

Another objective of the present disclosure is to manufacture a high-strength and low-specific weight foam molding product by increasing strength, which is reduced due to foaming, as high as possible by forming a high-strength smooth surface by reducing or completely removing a foaming phenomenon on the surface of the molding product by applying high gas pressure of 200 atmospheric pressure to sufficiently inject foaming gas so that the foaming gas is uniformly distributed as fine particles in resin and a composite of molten resin and the foaming gas becomes a complete critical solution.

Technical Solution

In order to achieve the objectives, the present disclosure provides a foam molding apparatus that includes a foaming agent supply unit configured to supply a foaming agent, a molten resin supply unit configured to supply molten resin, a fixed mixing unit configured to produce a foaming resin-critical solution by mixing a foaming agent supplied from the foaming agent supply unit and molten resin supplied from the molten resin supply unit through a rod-shaped body, and a molding unit configured to mold a foam molding product using the foaming resin-critical solution supplied from the fixed mixing unit.

Further, the rod-shaped body may include: plate-shaped members formed by 2-dimensionally arranging unit cells forming an aperture; and spacers connecting the plate-shaped members such that the plate-shaped members are stacked and the unit cells are 3-dimensionally arranged, in which the spacer connects adjacent plate-shaped members to each other with a gap that maintains the aperture.

Further, the plate-shaped member may be a layered structure 2-dimensionally repeated in a same pattern.

Further, the rod-shaped body may be a stacking structure in the layered structure and the spacer are repeated in the same pattern as the repeated pattern of the layered structure even in a direction in which adjacent layered structures are connected by the spacer.

Further, the rod-shaped body may be a stacking structure formed by repeating the unit cell and the spacer in x-, y-, and z-axial directions around one origin and the unit cell may be a 3D body famed by overlapping three octagonal prisms having a square as one surrounding surface such that axial lines are disposed along the x, y, and z axes around one origin; and the spacer may be a cube extending from the surrounding surface crossing the axial line, connected to the surrounding surface of an adjacent unit cell, and having the surrounding surface as one side.

Further, the unit cell and the spacer of the rod-shaped body may be 3D bodies having the same shape.

Further, the foaming agent supply unit may have one or more points for injecting the foaming agent into the fixed mixing unit.

Further, the foam molding apparatus may include a foaming resin storage unit configured to temporarily store the foaming resin-critical solution supplied from the fixed mixing unit to supply the foaming resin-critical solution into the molding unit.

Further, the foam molding apparatus may include a foaming resin injection unit configured to temporarily store the foaming resin-critical solution supplied from the fixed mixing unit to inject the foaming resin-critical solution into the molding unit.

Further, the foaming resin injection unit may include a heating unit configured to heat the foaming resin-critical solution in order to keep the foaming resin-critical solution in a molten state.

Further, the foam molding apparatus may include a foaming resin extrusion unit configured to temporarily store the foaming resin-critical solution supplied from the fixed mixing unit to extrude the foaming resin-critical solution into the molding unit.

Further, the present disclosure provides a foam molding method that includes: a molten resin supply step that supplies molten resin of a molten resin supply unit into a fixed mixing unit; a foaming agent supply step that supplies a foaming agent of a foaming agent supply unit into the fixed mixing unit; a fixed mixing step that mixes the molten resin and the foaming agent, which are supplied into the fixed mixing unit in the molten resin supply step and the foaming agent supply step, respectively, into a foaming resin-critical solution by distributing and expanding channels, through which the molten resin and the foaming agent flow, by passing the molten resin and the foaming agent through apertures of the fixed mixing unit; a foaming resin molding step that molds a foam molding product by collecting the foaming resin-critical solution, which is mixed and injected in the fixed mixing step, in a foaming resin injection unit and by injecting the foaming resin-critical solution into a molding unit, in which the fixed mixing unit includes: plate-shaped members formed by 2-dimensionally arranging unit cells foaming an aperture; and spacers connecting the plate-shaped members such that the plate-shaped members are stacked and the unit cells are 3-dimensionally arranged, in which the spacer connects adjacent plate-shaped members to each other with a gap that maintains the aperture.

Further, when there is a single foaming agent injection point for supplying the foaming agent into the fixed mixing unit, the foaming agent supply step may gradually increase the amount of a foaming agent that is supplied into the fixed mixing unit at the foaming agent injection point over time; and the foaming agent molding step may fill the foaming resin injection unit with the foaming resin-critical solution, in which the content of the foaming agent decreases or becomes zero toward an injection hole of the foaming resin injection unit and increases away from the injection hole, thereby gradually increasing the content of the foaming agent in the foaming resin-critical solution, which is injected into the molding unit from the foaming resin injection unit, over injection time such that a foaming ratio gradually increases and a filling position in the molding unit moves toward a center from a surface of the foam molding product.

Advantageous Effects

According to the foam molding apparatus and the foam molding method thereby of the present disclosure, since high-viscosity gel-state molten resin and a high-pressure compressed and low-viscosity foaming agent are supplied in a high-pressure atmosphere over 200 atmospheric pressure by a high-strength fixed missing unit having multiple channels, a foaming resin-critical solution can be produced by uniformly mixing a large amount of molten resin and foaming agent. Accordingly, it is possible to increase the foaming apertures, which are generated in a molding unit or an injection mold, as much as possible when a foaming resin-critical solution is supplied or injected into the molding unit or the injection mold, so the specific weight of a foam molding product can be considerably decreased, whereby it is possible to reduce the weight of the foam molding product.

Further, when molding is performed using a mixture of resin and a foaming gas which includes a complete critical solution in a high-pressure atmosphere, the foaming particles formed in a molding product are micro-level small elementary particular bubbles having a diameter of under 0.1 mm.

Accordingly, a foam molding product with a clean surface can be obtained.

Further, since the molten resin supplied in the fixed mixing unit can be maintained in a completely molten state at any points in the fixed mixing unit, it is possible to set a foaming agent injection point at any point on the fixed mixing unit.

Accordingly, it is possible to set a plurality of foaming agent injection point and it is possible to adjust the injection amount of a foaming agent using an on-off valve provided at each of the injection points, so it is possible to make the mixing ratio of a foaming agent and molten resin different in the fixed mixing unit in accordance with the positions of the injection points.

Further, even if there is a signal foaming agent injection point, it is possible to change the amount of a foaming agent that is supplied into the fixed mixing unit over time by adjusting the on-off valve.

Therefore, since it is possible to make the content of a foaming agent in a foaming resin-critical solution, which is injected into the foaming resin injection unit from the fixed mixing unit, different in accordance with a filling position in the foaming agent storage unit or the injection unit case, it is possible to freely improve the quality of the external appearance of a foam molding product that is foam-molded by being supplied or injected into the molding unit or the injection mold, so it is possible to supplement the strength of the foam molding product which is decreased by foaming.

That is, for example, since it is possible to increase the content of a foaming agent toward the nozzle of the foaming agent storage unit or it is possible to decrease the content of a foaming agent as it goes away from the nozzle or to make the content be 0 at the farthest position, it is possible to position a foaming resin-critical solution having no or a small amount of foaming agent at the rearmost end of the foaming resin storage unit and it is possible to increase the content of a foaming agent as it goes down. Accordingly, the foaming resin-critical solution having a large amount of foaming agent supplied in the early stage of injection is supplied to form the inside of a molding product in the molding unit, and the foaming resin-critical solution having no or a small amount of foaming agent is supplied to form the surface of the molding product. Accordingly, the surface of the foam molding product can become a non-foamed resin layer and a foaming layer having a high foaming ratio can be famed toward the center.

Further, for example, it is possible to reduce the content of a foaming agent as it is close to the injection hole of the foaming resin injection unit or make the content be 0 at the closest position, and it is possible to increase the content as it goes away from the injection hole. Accordingly, it is possible to position a foaming resin-critical solution having no or a small amount of foaming agent at the foremost end of the foaming resin injection unit and it is possible to increase the content of a foaming agent as it goes rearward. Accordingly, the foaming resin-critical solution having no or a small amount of foaming agent that is injected in the early stage of injection is supplied like being applied as the surface of a foam molding product along the inner surface of a cavity. Further, the foaming resin-critical solution having a large amount of foaming agent gradually fills the inside of the surface and finally fills the center portion. Accordingly, the surface of the foam molding product can become a non-foamed resin layer and a foaming layer having a high foaming ratio can be formed toward the center.

Accordingly, a high-ratio foaming layer is formed at the center portion, so the weight can be reduced. Further, a non-foaming resin layer is formed on the surface, so the strength is increased. Accordingly, a foam molding product for a structure which entirely has a honeycomb structure, is light, and has high strength can be obtained.

Further, since the surface of the foam molding product is a non-foaming resin layer, the external appearance of the foam molding product can be further improved.

Further, since, in injection molding, the surface of a foam molding product which is in contact with the inner surface of a cavity is a non-foaming resin layer and has highest density throughout the foam molding product, the contraction ratio that is generated when a foam resin-critical solution is hardened can be considerably decreased.

BRIEF DESCRIPTION OF THE DRAWINGS

The above and other objectives, features and other advantages of the present invention will be more clearly understood from the following detailed description when taken in conjunction with the accompanying drawings, in which.

BEST MODE

Hereafter, a foam molding apparatus according to an embodiment of the present disclosure is described in detail.

Figure 2:
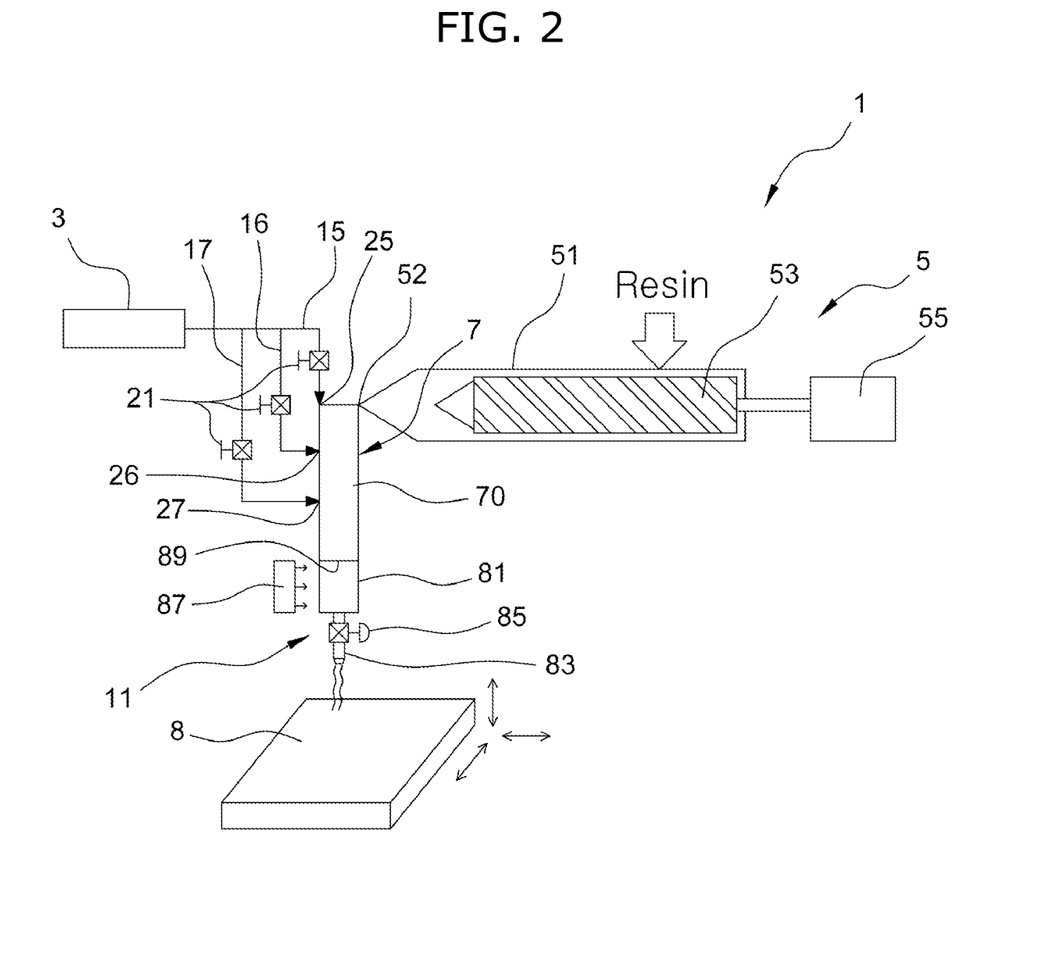
FIG. 2 is a view schematically showing a foam molding apparatus according to an embodiment of the present disclosure.

A foam molding apparatus of the present disclosure, as schematically indicated by reference numeral '1' in FIG. 2, in a broad meaning, includes a foaming agent supply unit 30, a molten resin supply unit 5, a fixed mixing unit 7, and a molding unit 8.

In this configuration, the foaming agent supply unit 3, which is a component configured to inject and supply a foaming agent, which is used to mix a foaming resin-critical solution, into the fixed mixing unit 7, for example, as shown in FIG. 2, is connected to the fixed mixing unit 7 through at least one or more pipelines 15, 16, and 17, and has one or more foaming agent input points 25, 26, and 27 at which a foaming agent is injected. Accordingly, the foaming agent supply unit 3 supplies a foaming agent, such as liquefied carbon dioxide, liquefied nitrogen, high-pressure hydrogen, steam, alcohol, organic polymer gas, and helium, into the fixed mixing unit 7 simultaneously or at different timings at the input points 25, 26, and 27. In particular, the foaming agent may be a foaming agent compressed and liquefied at high pressure such as liquefied carbon dioxide or liquefied nitrogen, and has relatively low viscosity for the properties.

The molten resin supply unit 5, which is a component configured to inject and supply molten resin, which is used to mix a foaming resin-critical solution, together with the foaming agent, into the fixed mixing unit 7, is connected to an end of the fixed mixing unit 7, as shown in FIG. 2. Although only one molten resin supply unit 5 is shown in FIG. 2, a plurality of molten resin supply units may be provided, if necessary.

Figure 5:
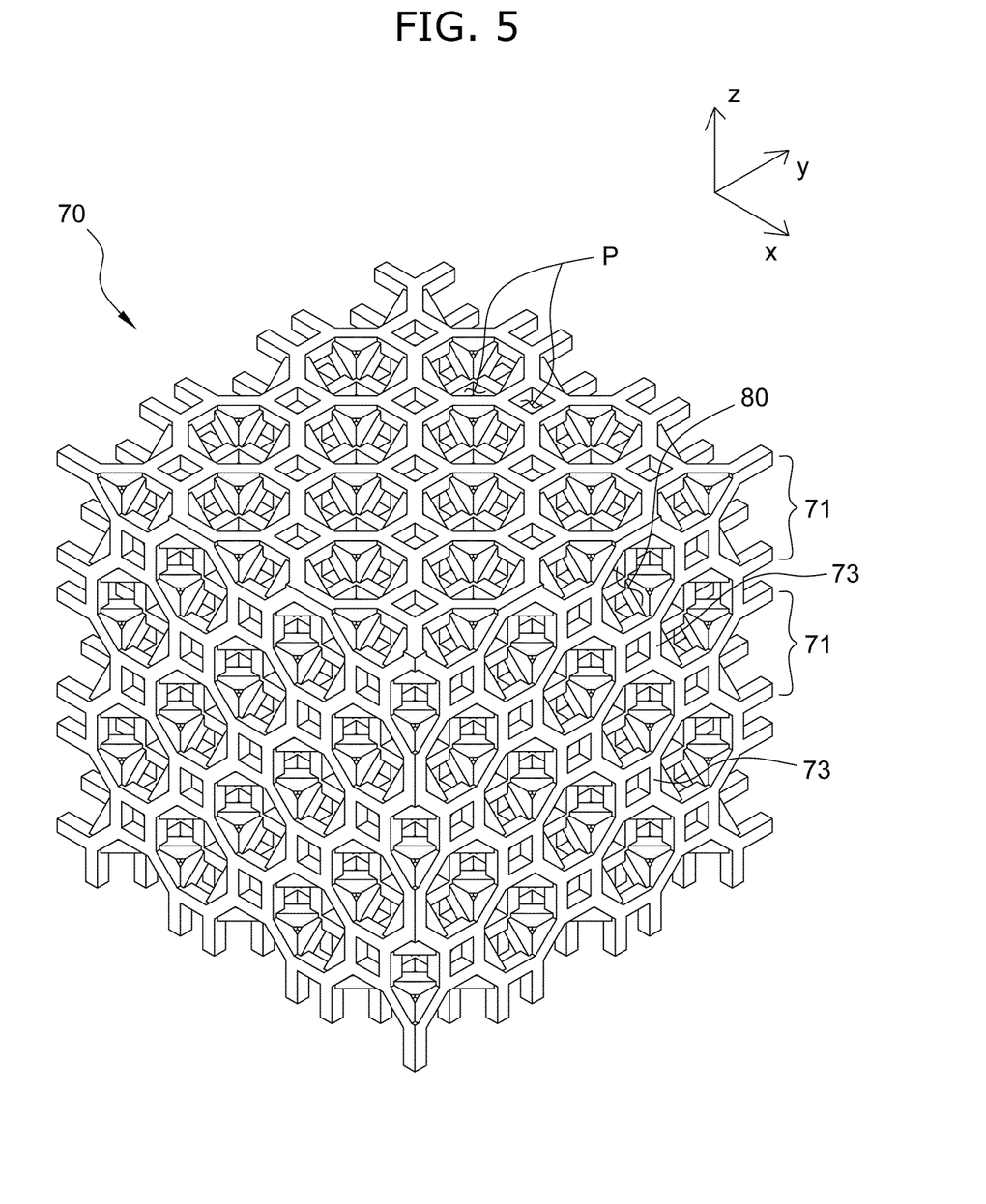
FIG. 5 is an enlarged perspective view showing the inside shape of the rod-shaped body.

Meanwhile, the molten resin supply unit 5 may be manufactured not only in a container type that is supplied with resin molten outside, but in a melting device type that melts resin, which is supplied from the outside, by itself, as shown in FIG. 2. Accordingly, the molten resin supply unit 5 shown in FIG. 5 is composed of a cylindrical case 51 that melts input resin, a feeding screw 53, and a screw motor 55. The molten resin supply unit 5 heats and melts resin supplied into the case 51 from the outside using a heating unit (not shown) and then feeds the resin to an outlet 52 using the feeding screw 54 by operating the driving motor 55. Accordingly, the molten resin produced in the molten resin supply unit 5 is fed in a gel state having relatively high viscosity (substantially in a viscoelastic state) and supplied into the fixed mixing unit 7. However, the feeding screw 53 may be operated in a hydraulic type.

Figure 3:
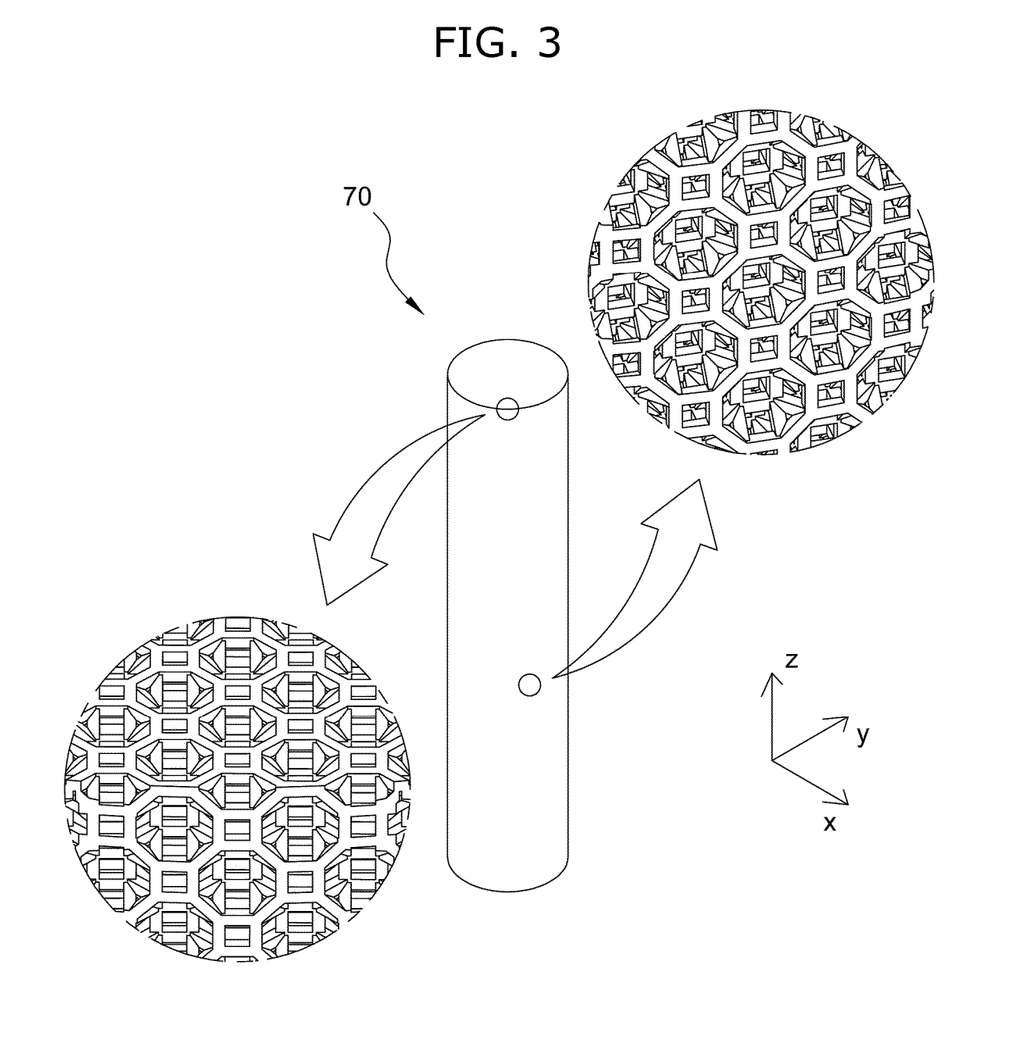
FIG. 3 is a perspective view showing a rod-shaped body that is a fixed mixing part shown in FIG. 2.
Figure 4:
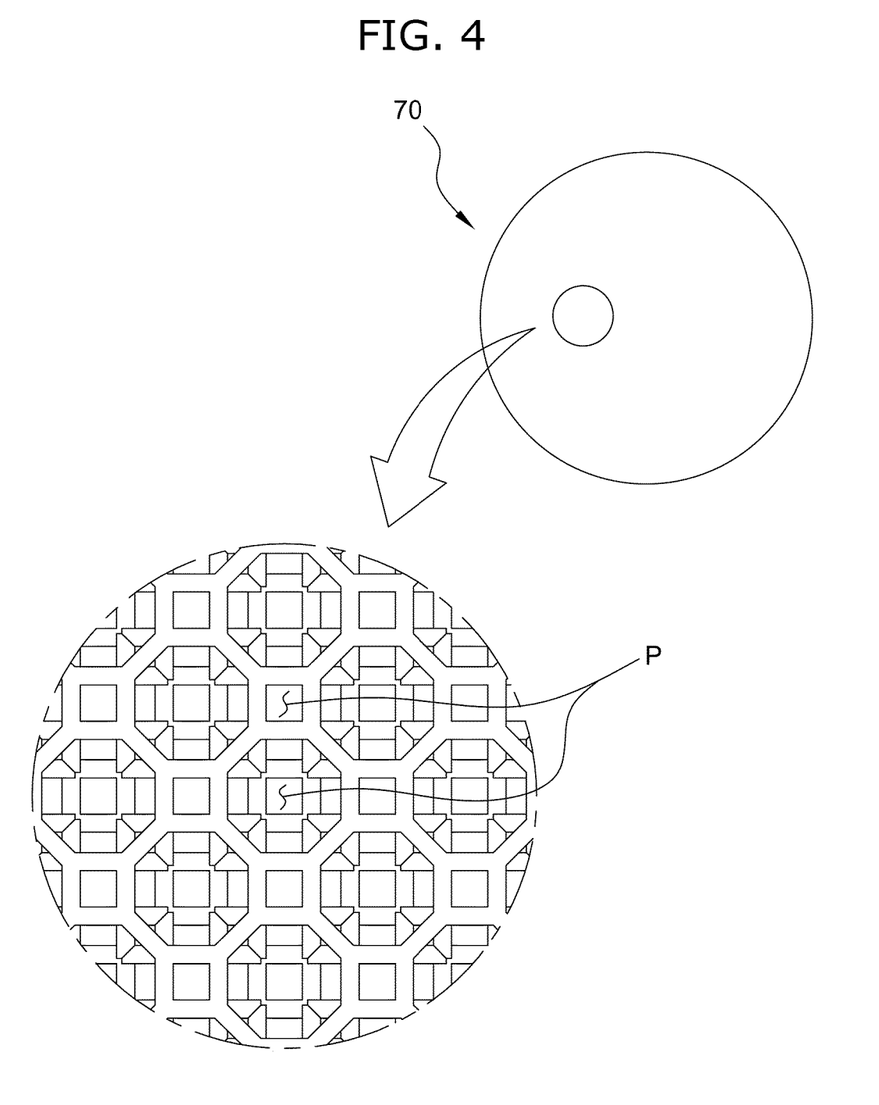
FIG. 4 is a plan view showing an end of the rod-shaped body shown in FIG. 3.

The fixed mixing unit 7, which is a component configured to mix a foaming agent supplied from the foaming agent supply unit 3 and molten resin supplied from the molten resin supply unit 5, as shown in FIGS. 2 to 4, has the rod-shaped body 70 having multiple channels P therein. Although only the rod-shaped body 70 therein is shown in FIG. 2, but, of course, an outer case surrounding the rod-shaped body 70 or connection pipes connected to the first to third pipelines 15, 16, and 17 or connected to the outlet of the molten resin supply unit 5 are provided, but these are not shown in the figure for convenience.

In this way, the fixed mixing unit 7 uniformly mixes high-viscosity gel-state molten resin supplied from the molten resin supply unit 5 and a low-viscosity liquid foaming agent compressed at high pressure and supplied from the foaming agent supply unit 3. The fixed mixing unit 7 mixes a foaming agent and molten resin using a fixed stirring type that mixes fluid to be mixed by repeatedly distributing and expanding channels through which the fluid flows rather than an existing rotary stirring type that mixes (agitates) objects to be mixed by rotating a stirring device, etc. To this end, the fixed mixing unit 7, as shown in FIGS. 3 to 5, includes a porous rod-shaped body 70. The rod-shaped body 70 of the fixed mixing unit 7, as shown in FIGS. 3 to 5, is a porous member having several apertures.

To this end, the rod-shaped body 70, as shown in FIGS. 3 to 7, includes several plate-shaped members 71 and several spacers 73 connecting the plate-shaped members 71.

In this configuration, the plate-shaped member 71 is formed by arranging several unit cells 80, which are minimum units forming an aperture, 2-dimensionally, that is, on an xy plane, an yz plane, or a zx plane in an xyz coordinate system having one origin as a center. The plate-shaped members 71 may be the same or not in shape, and the unit cells 80 of one plate-shaped member 71 may be the same or not in shape, and accordingly, the arrangement may be regularly repeated or may be irregular. However, as shown in FIGS. 3 to 5, the plate-shaped members 71 may be repeated 2-dimensionally with the same pattern, that is, may have a layered structure, and the size of the unit cells 80 may not exceed a size that enables a foaming agent and molten resin to be stirred by the fixed stirring type described above.

The spacer 73, which is provided to secure a gap between a plate-shaped member 71 and a plate-shaped member 71 by connecting a plate-shaped member 71 and an adjacent plate-shaped member 71, connects a plate-shaped member 71 and a plate-shaped member 71 to form the rod-shaped body 70 by stacking the plate-shaped members 71. The unit cells 80 2-dimensionally arranged in the plate-shaped members 71 are 3-dimensionally arranged by stacking the plate-shaped members 71. That is, several unit cells are arranged in a space defined by x, y, and z axes. Further, the spacer 73 secures a space between a plate-shaped member 71 and a plate-shaped member, thereby enabling a high-pressure foaming agent to smoothly pass between the plate-shaped member 71 and the plate-shaped member 71 even though molten resin is pressurized by the foaming agent when the foaming agent is supplied into the rod-shaped body 70 in which high-viscosity viscoelastic molten resin is supplied. That is, the spacer 73 is provided to connect a plate-shaped member 71 and a plate-shaped member 71 and secure a gap that can maintain an aperture between the plate-shaped member 71 and the plate-shaped member 71.

However, when the plate-shaped members 71 are formed in a layered structure, as described above, that is, the internal apertures are 2-dimensionally repeated with the same patterns, for example, as enlarged in FIGS. 3 to 5, the spacers 73 may be repeated in the same pattern as the repeated patterns in the layered structure in the direction in which two adjacent layered structures are connected together with connected layered structures, so the rod-shaped body 70 formed in this way is referred to as a stacking structure. Accordingly, same patterns are 3-dimensionally repeated in the stacking structure, as enlarged in FIGS. 3 to 5. That is, the stacking structure has a 3D lattice structure.

Figure 6:
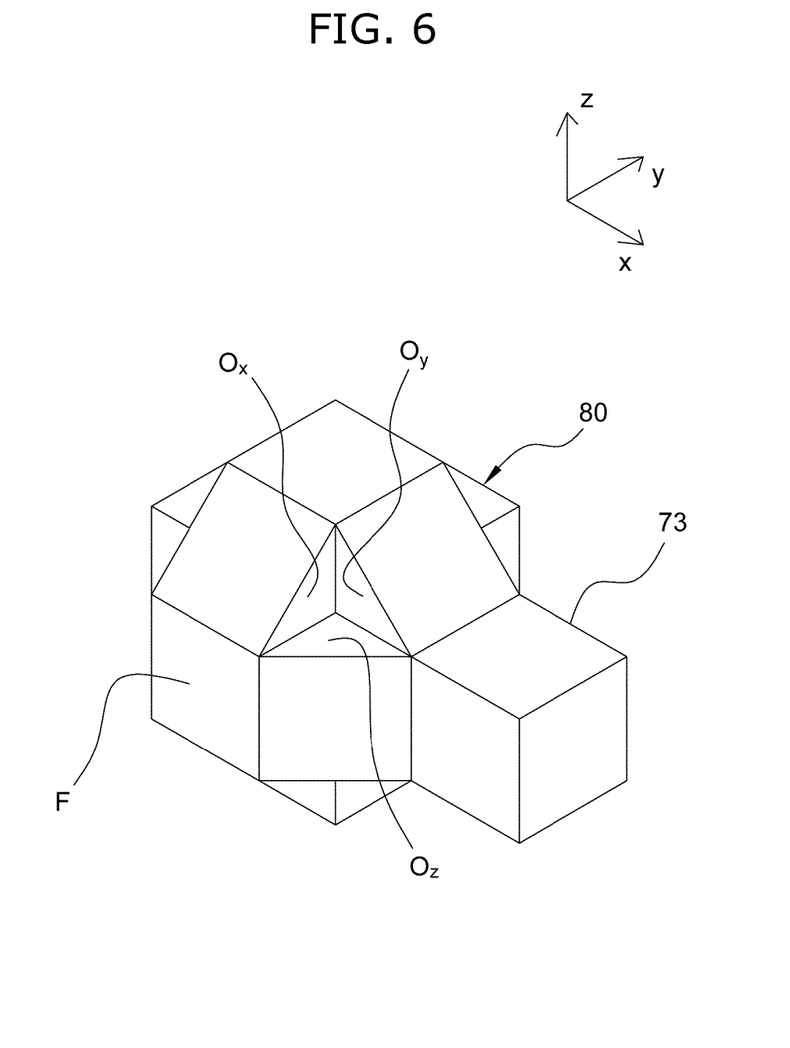
FIG. 6 is a perspective view schematically and linearly showing a unit cell of the rod-shaped body shown in FIG. 3.
Figure 7:
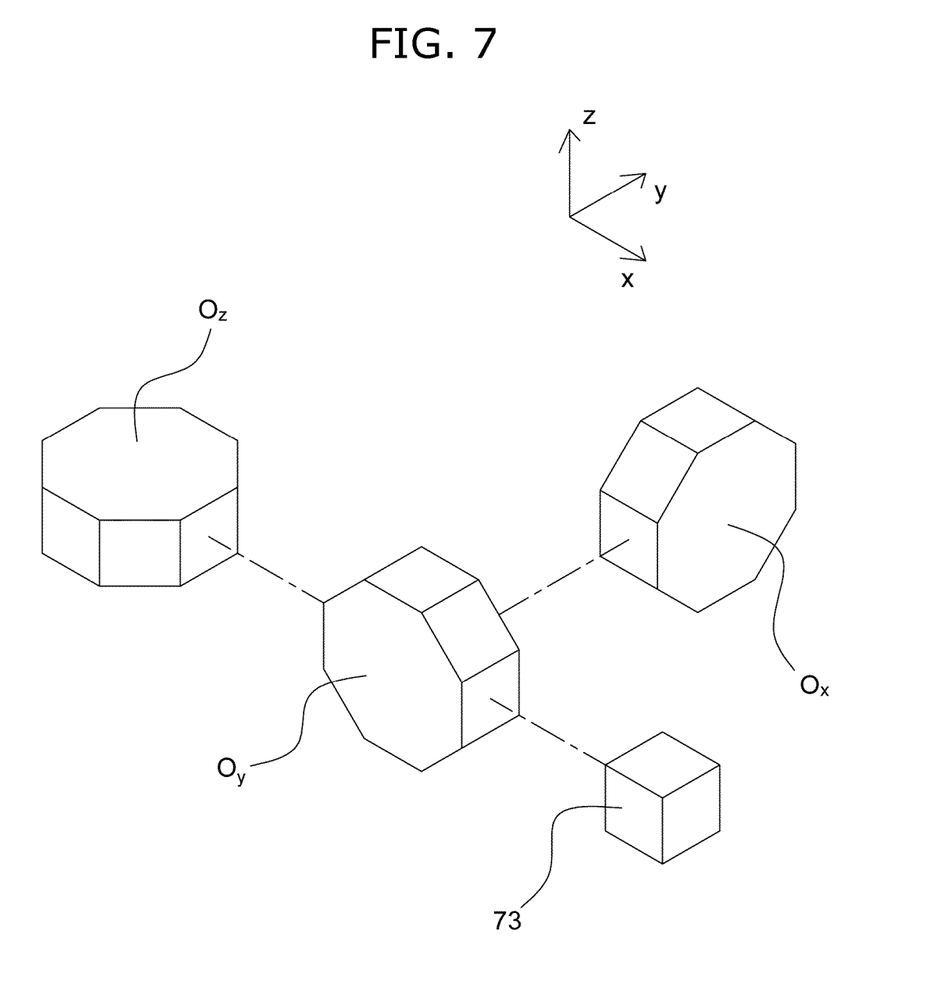
FIG. 7 is a perspective view the unit cell of FIG. 6 divided into components.

In this case, a minimum pattern of the stacking structure shown in FIGS. 3 to 5, as shown in FIGS. 6 and 7, is composed of one unit cell 80 and one spacer 73 connected to a side of the unit cell 80. That is, basic patterns each composed of one unit cell 80 and one spacer 73 are repeated in the x, y, and z axes around one origin in the rod-shaped body 70 shown in FIGS. 3 to 5, whereby the stacking structure is formed.

Further, the basic pattern shown in FIG. 6 may be divided into components, as shown in FIG. 7. According to this configuration, a unit cell 80 is a 3D body formed by overlapping three octagonal prisms Ox, Oy, and Oz having a square as one surrounding surface F such that the axial lines are disposed along the x, y, and z axes around one origin. Further, when the spacer 73 is disposed in a plate-shaped member 72, that is, a layered structure in the zy plane, as shown in FIG. 6, extends from the surrounding surface F of which the axial line is disposed along the x axis, that is, the surrounding surface crossing the axial line, so it is connected to a surrounding surface F corresponding to the unit cell 80 of the plate-shaped member 71 adjacent to the surrounding surface F. In this case, since all of the octagonal prisms Ox, Oy, and Oz are regular octagons, the space 73 is a cube having the surrounding surface F as one side.

Figure 8:
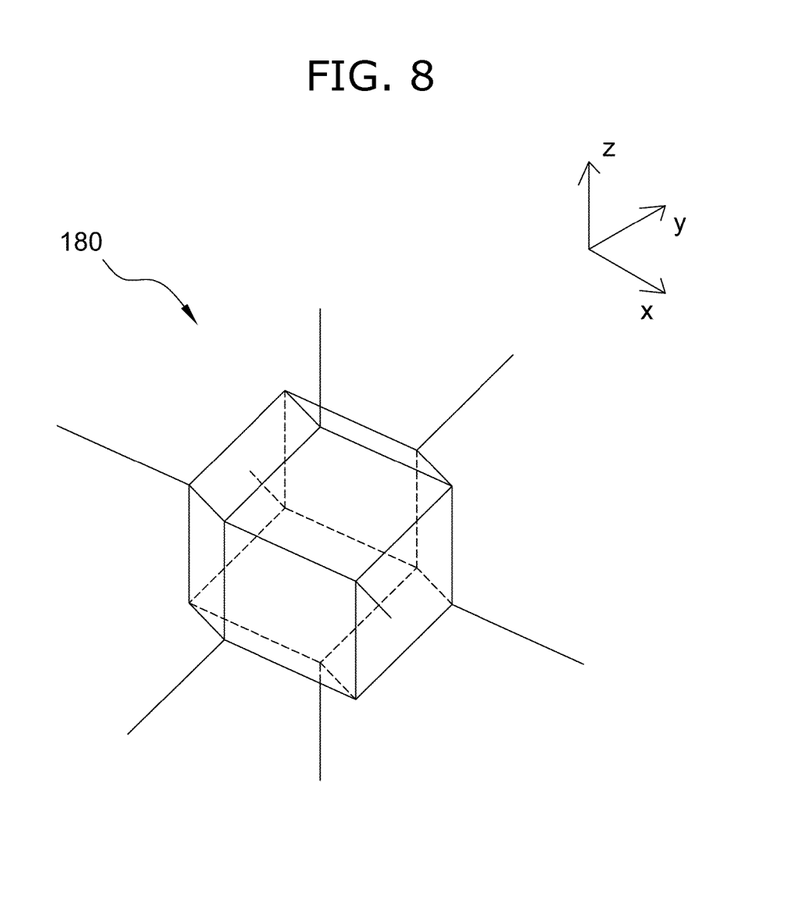
FIG. 8 is a perspective view schematically showing a unit cell according to another embodiment of the present disclosure.

Meanwhile, another embodiment of the unit cell 180 is shown in FIG. 8. Similarly, the unit cell 180 is also a minimum unit forming apertures in a rod-shaped body and one plate-shaped member is formed by 2-dimensionally arranging several unit cells 180, but the plate-shaped members have the same shape.

Further, the same unit cells 180 are regularly repeatedly arranged in one plate-shaped member, a layered structure is formed. In this case, the size of unit cell 180 does not exceed a size that enables a foaming agent and molten resin to be stirred in the fixed stirring type.

In particular, in the rod-shaped body composed of the unit cells 180, the unit cells 180 are spacers, so same patterns are repeated not only 2-dimensionally, but 3-dimensionally. That is, the rod-shaped body is the same as a stacking structure in which a plate-shaped member composed of the unit cells 180 in the first and third rows has the unit cells 180 in the second rows as spacers.

Accordingly, the fixed mixing unit 7 produces a foaming resin-critical solution by mixing a foaming agent and molten resin through multiple channels P under a high-temperature and high-pressure atmosphere.

This is because when two kinds of fluid, that as, a foaming agent and molten resin flow through the multiple channels P of the fixed mixing unit 7, the fluid repeats distribution and collection in accordance with the sizes of the channels P and accordingly uniform mixing is possible. In this case, since the fixed mixing unit 7 includes the high-strength rod-shaped body 70, it can pass high-viscosity fluid without a problem with durability. Accordingly, since there is no problem with durability, the diameter of the multiple channels P, that is, the size of the apertures does not need to be large, and accordingly, poor kneading due to an increase of the diameter of the multiple channels is not generated, so it is not required to increase the length of the rod-shaped body 70 in order to achieve mixing uniformity.

Meanwhile, the state of a solution obtained by uniformly mixing a foaming agent and molten resin in a high-temperature and high-pressure atmosphere is defined and may also be referred to as a foaming molten resin-critical solution, and this is because a pseudosolution or critical solution state is formed.

Accordingly, though not shown, the fixed mixing unit 7 of the foam molding apparatus 1 may directly supply a mixed foaming resin-critical solution into the molding unit 8 without through a foaming resin storage unit 11.

However, as shown in FIG. 2, the foaming resin storage unit 11 may be provided. The foaming resin storage unit 11, which is a component configured to store a foaming resin-critical solution for molding, is connected to an inlet 89 of the fixed mixing unit 7 and temporarily stops a foaming resin-critical solution pushed out through the inlet 89 by pressure after mixed in the fixed mixing unit 7. To this end, the foaming resin storage unit 11 includes a case 81 forming a body, a nozzle 83 formed on the case 81 opposite to the inlet 89, and a valve 85 opening/closing the nozzle 83, and may further include a heating unit 87 that heats the foaming resin-critical solution supplied in the case 81 to store the foaming resin-critical solution in a molten state.

Accordingly, the foaming resin storage unit 11 maintains the foaming resin-critical solution supplied in the case 81 from the fixed mixing unit 7 in the molten state by the heating unit 71, and supplies the foaming resin-critical solution into the molding unit 8 through the nozzle 83 by opening the valve 8 when a predetermined amount is measured in the case 81.

The molding unit 8, which is a component configured to mold the foaming resin-critical solution supplied from the foaming resin storage unit 11 into a predetermined foam molding product, as shown in FIG. 2, may be provided in various types, depending on the molding method. As will be described with reference to FIG. 9, an injection mold 9 may be used for injection molding of a foaming resin-critical solution and an extrusion mold may be used for extrusion or profile extrusion. Further, the molding unit 8 is a molding plate that can be moved forward, rearward, left, right, up, and down for profile forming, as shown in FIG. 2. However, when the molding unit 8 is fixed, the nozzle 83 and the case 81 may be connected through a flexible pipe, etc. so that the nozzle 83 can be moved forward, rearward, left, right, up, and down with respect to the molding unit 8. As described above, for profile molding, it is possible to considerably reduce the mold cost and mold extra-large products.

Figure 9:
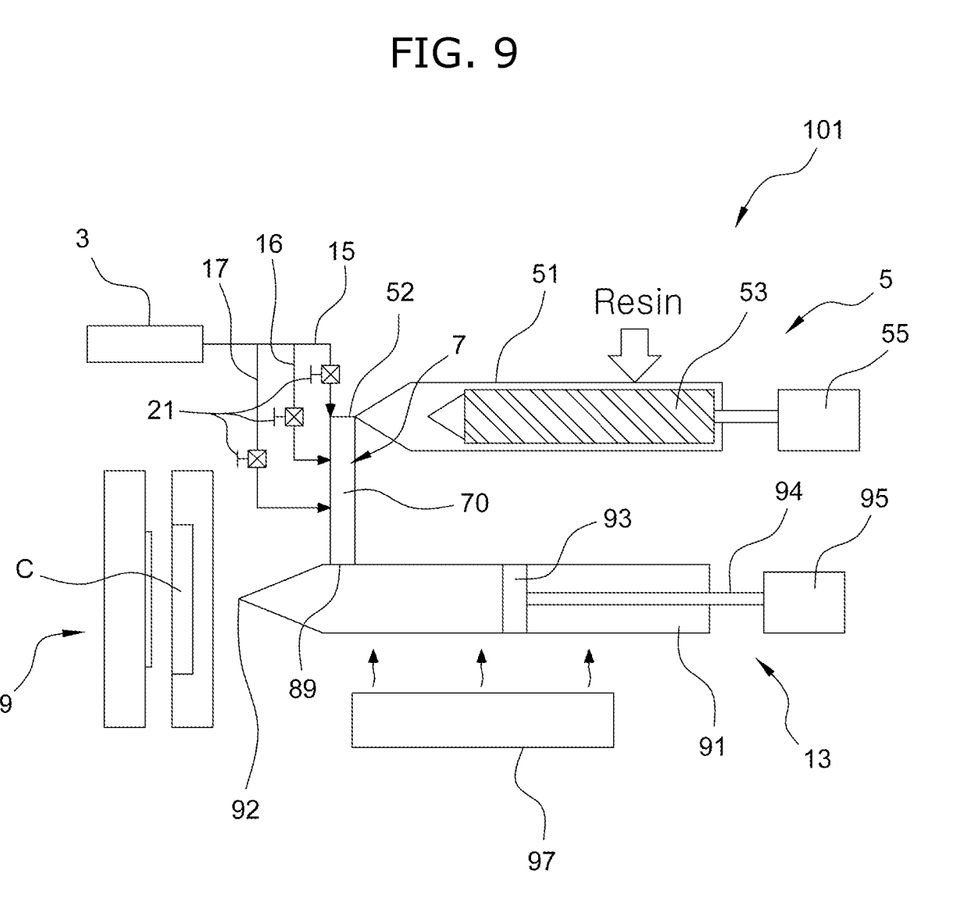
FIG. 9 is a view schematically showing a foam molding apparatus according to another embodiment of the present disclosure.
Figure 10:
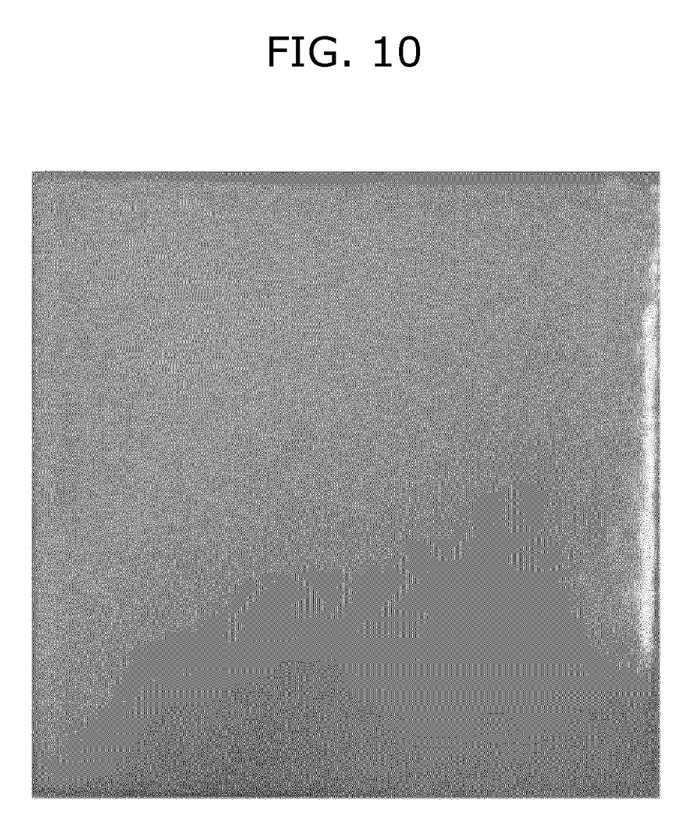
FIG. 10 is an exemplary picture of a foam molding product manufactured through foam molding by mixing a foaming agent and molten resin using a foam molding apparatus of the present disclosure.

A foam molding apparatus according to another embodiment of the present disclosure is indicated by reference numeral 101 and schematically shown in FIG. 9. The foam molding apparatus 101, as shown in the figure, similar to the foam molding apparatus 1, includes, in a broad meaning, a foaming agent supply unit 3, a molten resin supply unit 5, a fixed mixing unit 7, and a molding unit 9, and is the same as the foam molding apparatus 1 except that a foaming resin injection unit 13 is provided instead of the foaming resin storage unit 11 of the foam molding apparatus 1 and an injection mold is used as the molding unit 9.

Accordingly, the description of the foam molding apparatus 1 is referred to for the foaming agent supply unit 3, the molten resin supply unit 5, and the fixed mixing unit 7, which are not described in this case.

However, the foaming resin injection unit 13 temporarily stores foaming resin-critical solution, which is mixed and injected from the fixed mixing unit 7, for injection, and as shown in FIG. 9, includes a case 91 connected to an inlet 89 of the fixed mixing unit 7, a plunger or screw 93 mounted in the case 91, and a driving motor 95 operating the plunger 93 through a push rod 94, and includes a heating unit 97 that heats the foaming resin-critical solution supplied in the case 91 in a molten state.

Accordingly, the foaming resin injection unit 13 maintains the foaming resin-critical solution supplied in the case 91 from the fixed mixing unit 7 in a molten state by the heating unit 97, and extrudes the foaming resin-critical solution to the molding unit 9 that is an injection mold connected to an outlet by moving the plunger or screw 93 using the driving motor 95 or hydraulic pressure when a predetermined amount is measured in the case 91.

The molding unit 9, as shown in FIG. 9, molds a predetermined foam molding product by filling a cavity with the foaming resin-critical solution extruded from the foaming resin injection unit 13.

Hereafter, a foam molding method by the foam molding apparatuses 1 and 101 according to an exemplary embodiment of the present disclosure is described.

The foam molding method according to the present disclosure, in a broad meaning, includes a molten resin supply step S10, a foaming agent supply unit S20, a fixed mixing step S30, and a foaming resin molding step S40.

The molten resin supply step S10, which is a step of supplying molten resin in the molten resin supply unit 5 into the fixed mixing unit 7, as shown in FIG. 2, molten resin, which is supplied in a molten state in the molten resin supply unit 5 or high-viscosity molten resin which is supplied in a pre-molten state and melted in the molten resin supply unit 5, into the fixed molding unit 7 through an outlet at a front end by rotating the feeding screw 53 that is operated by the motor 55 or hydraulic pressure.

The foaming agent supply step S20, which is a step of supplying a foaming agent in the foaming agent supply unit 3 into the fixed mixing unit 7, as shown in FIG. 2, supplies a foaming agent compressed at high pressure in the foaming agent supply unit 3 into the fixed mixing unit 7 through one or more pipelines 15, 16, and 17.

The fixed mixing step S30, which is a step of mixing molten resin and a foaming agent supplied in the fixed mixing unit 7 in the molten resin supply step S10 and the foaming agent supply step S20, respectively, as shown in FIG. 2, passes the molten resin and the foaming agent through the multiple channels P of the fixed mixing unit 7 such that the molten resin and the foaming agent are uniformly mixed into a foaming resin-critical solution by repeating distribution and collection through the multiple channels P. Since the rod-shaped body 70 of the fixed mixing unit 7 is made of high-strength metal, such as titanium, or plastic, the diameter of the multiple channels P, that is, the size of apertures can be freely adjusted. Further, since it is possible to adjust the diameter of the multiple channels P, that is, the density of the internal space, a large amount of foaming gas may be simultaneously or sequentially supplied. Further, unlike a foaming resin mixer of the related art which cannot seal the operation part at which a screw is rotated, for example over 120 atmospheric pressure, the multiple channels P can be easily sealed even over 200 atmospheric pressure, sealing is possible even if a large amount of foaming gas is supplied at high pressure.

The foaming resin molding step S40, which is a step of molding a foam molding product by supplying the foaming resin-critical solution mixed and injected by the fixed molding unit 7 into the molding unit 8, as shown in FIG. 2, keeps foaming resin-critical solution, which is injected in the foaming resin storage unit 11, in the foaming resin storage unit 11, and supplies the foaming resin-critical solution into the molding unit 8 when the valve 85 is opened.

The foaming resin-critical solution that is injected into the foaming resin storage unit 11 from the fixed mixing unit 7 is filled into the cylindrical case 81 toward the inlet 89 from the portion far from the inlet 89 connected with the fixed mixing unit 7. That is, as shown in FIG. 2, when the inlet 89 is disposed at the front end of the case 81, the foaming resin-critical solution that is injected into the foaming resin storage unit 11 from the fixed mixing unit 7 is filled toward the ceiling from the bottom of the case 81 which is far from the inlet 89.

Thereafter, the foaming resin-critical solution filled in the case 81 is supplied into the molding unit 8 through the nozzle when the valve 85 is opened, and is molded into a foam molding product therein. For example, for profile forming, foaming resin-critical solution is supplied into the molding unit 8 while the molding unit 8 is moved, and movement of the molding unit 8 is controlled by a computer, etc., whereby molding is performed like a 3D printer.

Meanwhile, since the present disclosure employs the fixed mixing unit 7 as a component for mixing a foaming agent and molten resin, a foaming agent can be supplied from any part of the surface of the rod-shaped body 70 under the same condition. That is, molten resin supplied in the multiple channels P are in a completely molten state at any points in the multiple channels P, so the influence on the foaming agent by the molten resin is constant when the molten resin is supplied into the multiple channels P. Accordingly, as shown in FIG. 2, it is possible to set a point for supplying a foaming agent into the fixed mixing unit 7 at any point and it is possible to set one or more points.

Meanwhile, a plurality of pipelines for supplying a foaming agent, that is, the first to third pipelines 15, 16, and 17 can be controlled to be opened and closed by on-off valves 21. Accordingly, it is possible to change the amount of a foaming agent that is supplied into the fixed mixing unit 7, depending on the foaming agent injection points, by selectively adjusting the amount of opening of the on-off valves 21. Further, the foaming agent supply unit 3 can control the amount of foaming agent, which is supplied at the foaming agent injection points, over time by adjusting the opening/closing time of the on-off valves 21.

Accordingly, when there is a plurality of foaming agent injection points for supplying a foaming agent into the fixed mixing unit 7, it is possible to reduce the injection amount of a foaming agent or stops injecting a foaming agent an injection points closer to the inlet 89 of the fixed mixing unit 7, for example, at an injection point of the first pipeline 15 rather than the second and third pipelines 16 and 17 in FIG. 2 by adjusting the amount of opening of the valves of the first to third pipelines 15, 16, and 17 in the foaming agent supply step S20.

That is, the distances from the injection points 25, 26, and 27 of the pipelines 15, 16, and 17 to the inlet 89 of the fixed mixing unit 7 are different, so even if a foaming agent is simultaneously supplied into the pipelines 15, 16, and 17, the supply time of a foaming resin-critical solution into the molding unit 8 through the inlet 89 and the nozzle 83 is different due to the distance differences between the injection ports and the inlet 89. In this case, it is possible to change the amount of a foaming agent, which is supplied from the foaming agent injection ports, over time by adjusting the amount of opening of the valves 21. For example, it is possible to minimize the amount of a foaming agent that is supplied into the fixed mixing unit 7 through the pipeline 15 by minimally opening the valve 21, maintain the injection amount of a foaming agent through the pipeline 16 at a medium level, and maximize the injection amount of a foaming agent through the pipeline 17 by maximizing the degree of opening of the valve 21.

Accordingly, a foaming resin-critical solution of a high ratio, that is, having most bubbles is produced from the largest amount of foaming agent supplied from the pipeline 17 closest to the inlet 89, and the critical solution of a high ratio is injected first into the molding unit 8 through the nozzle 83. Further, a critical solution of a medium ratio produced by the medium amount of foaming agent supplied from the pipeline 16 at the medium distance is supplied into the molding unit 8 after the critical solution of a high ratio, and a critical solution produced from the small amount of foaming agent supplied through the farthest pipeline 15 is supplied last into the molding unit 8. Accordingly, a foaming part of a high ratio, that is, having lowest density is formed inside the molding product, and a foaming part of a low ratio, that is, having highest density is formed on the surface. As a result, a high-ratio foaming layer is formed at the center portion, so the weight can be reduced. Further, a low-foaming or non-foaming resin layer is formed on the surface, so the strength is increased. Accordingly, a foam molding product for a structure which has an entirely honeycomb structure, is light, and has high strength can be obtained.

Even though there is a single foaming agent injection point, it is possible to gradually decrease the injection amount of a foaming agent that is supplied into the fixed mixing unit 7 to 0 over time by gradually reducing the amount of opening of the valve 21 over time in the foaming agent supply step S20. Accordingly, the foaming resin-critical solution that is injected at a position adjacent to the inlet 89 of the case 81, that is, that is injected and filled later in the case 81 in the foaming agent molding step S40 contains no or a small amount of foaming agent, and the content of the foaming agent increases as it goes away from the inlet 89.

Accordingly, since the foaming ratio of the foaming resin-critical solution that is supplied into the molding unit 8 from the foaming resin storage unit 11 gradually decreases because the content of the foaming agent gradually reduces over injection time, the foaming resin-critical solution forms the inside of the foam molding product by filling the molding unit 8, for example, with maximum content of the foaming agent at the early stage of injection, and the filling position is gradually moved to the surface of the foam molding product while the content of the foaming agent decreases over time. In other words, in the foaming resin-critical solution that is supplied into the molding unit 8 from the foaming resin storage unit 11, the content of the foaming agent gradually decreases over time from the maximum at the early stage, so foaming resin-critical solution containing a large amount of foaming agent is positioned inside the foam molding product, and accordingly, high-ratio foaming occurs. On the other hand, a resin layer having no or a small amount of foaming agent is formed on the surface of the foam molding product, thereby surrounding the high-ratio foaming part positioned inside. Accordingly, the surface of the foam molding product is a non-foaming resin layer, the center is a high-ratio foamed resin layer, and the entire structure has a honeycomb structure, so a high-strength foam molding product for a structure is obtained.

Meanwhile, a foam molding method according to another embodiment of the present disclosure also includes, in a broad meaning, a molten resin supply step S10, a foaming agent supply step S20, a fixed mixing step S30, and a foaming resin molding step S40. The molten resin supply step S10, the foaming agent supply step S20, the fixed mixing step S30 were described above, so they are not described again.

However, the foaming resin molding step S40 molds a foam molding product by injecting the foaming resin-critical solution, which is mixed and injected by the fixed mixing unit 7 in the fixed mixing step S30, into the molding unit 9, in which, as shown in FIG. 9, the foaming resin-critical solution injected in the foaming resin injection unit 13 is collected in the foaming resin injection unit 13 and is injected into the molding unit 9 by forward/rearward motion of the plunger 93 that is operated by the motor 95 or hydraulic pressure. The foaming resin-critical solution that is injected into the foaming resin injection unit 13 from the fixed mixing unit 7 gradually fills the inside of the cylindrical case 91 from the portion close to the inlet 89 connected with the fixed mixing unit 7. That is, as shown in FIG. 9, when the inlet 89 is disposed at the front end of the case 91, the foaming resin-critical solution that is injected into the foaming resin injection unit 13 from the fixed mixing unit 7 is filled toward the rear end from the front end of the case 91 which is close to the inlet 89.

Thereafter, when the motor 95 or an hydraulic apparatus is operated an the plunger 93 is moved forward, the foaming resin-critical solution in the case 91 is injected into the molding unit 9 through an injection hole 92, thereby molded into a foam molding product.

Industrial Applicability

According to the foam molding apparatus and the foam molding method thereby of the present disclosure, since high-viscosity gel-state molten resin and a high-pressure compressed and low-viscosity foaming agent are supplied in a high-pressure atmosphere over 200 atmospheric pressure by a high-strength fixed missing unit having multiple channels, a foaming resin-critical solution can be produced by uniformly mixing a large amount of molten resin and foaming agent. Accordingly, it is possible to increase the foaming apertures, which are generated in a molding unit or an injection mold, as much as possible when a foaming resin-critical solution is supplied or injected into the molding unit or the injection mold, so the specific weight of a foam molding product can be considerably decreased, whereby it is possible to reduce the weight of the foam molding product.

What is claimed is:

1. A foam molding apparatus comprising:
   a foaming agent supply unit configured to supply a foaming agent;
   a molten resin supply unit configured to supply molten resin;
   a fixed mixing unit configured to produce a foaming resin-critical solution by mixing a foaming agent supplied from the foaming agent supply unit and molten resin supplied from the molten resin supply unit through multiple channels of a rod-shaped body; and
   a molding unit configured to mold a foam molding product using the foaming resin-critical solution supplied from the fixed mixing unit,
   wherein the rod-shaped body includes:
   plate-shaped members formed by 2-dimensionally arranging unit cells forming an aperture; and
   spacers connecting the plate-shaped members such that the plate-shaped members are stacked and the unit cells are 3-dimensionally arranged,
   wherein the spacers connect adjacent plate-shaped members to each other with a gap that maintains the aperture,
   wherein the plate-shaped members form a layered structure 2-dimensionally repeated in a same pattern,
   wherein the rod-shaped body is a stacking structure in the layered structure and the spacers are repeated in the same pattern as the repeated pattern of the layered structure even in a direction in which adjacent layered structures are connected by the spacers,
   wherein the rod-shaped body is a stacking structure formed by repeating the unit cells and the spacers in x-, y-, and z-axial directions around one origin and each of the unit cells is a 3D body formed by overlapping three octagonal prisms having a square as one surrounding surface such that axial lines are disposed along the x, y, and z axes around one origin; and
   each of the spacers is a cube extending from the surrounding surface crossing the axial line, connected to the surrounding surface of an adjacent unit cell, and having the surrounding surface as one side.

2. The foam molding apparatus of claim 1, wherein the unit cells and the spacers of the rod-shaped body are 3D bodies having a same shape.

3. The foam molding apparatus of claim 2, wherein the foaming agent supply unit has one or more points for injecting the foaming agent into the fixed mixing unit.

4. The foam molding apparatus of claim 2, further comprising a foaming resin storage unit configured to temporarily store the foaming resin-critical solution supplied from the fixed mixing unit to supply the foaming resin-critical solution into the molding unit.

5. The foam molding apparatus of claim 2, further comprising a foaming resin injection unit configured to temporarily store the foaming resin-critical solution supplied from the fixed mixing unit to inject the foaming resin-critical solution into the molding unit.

6. The foam molding apparatus of claim 2, further comprising a foaming resin extrusion unit configured to temporarily store the foaming resin-critical solution supplied from the fixed mixing unit to extrude the foaming resin-critical solution into the molding unit.

7. The foam molding apparatus of claim 1, wherein the foaming agent supply unit has one or more points for injecting the foaming agent into the fixed mixing unit.

8. The foam molding apparatus of claim 1, further comprising a foaming resin storage unit configured to temporarily store the foaming resin-critical solution supplied from the fixed mixing unit to supply the foaming resin-critical solution into the molding unit.

9. The foam molding apparatus of claim 1, further comprising a foaming resin injection unit configured to temporarily store the foaming resin-critical solution supplied from the fixed mixing unit to inject the foaming resin-critical solution into the molding unit.

10. The foam molding apparatus of claim 9, wherein the foaming resin injection unit includes a heating unit configured to heat the foaming resin-critical solution in order to keep the foaming resin-critical solution in a molten state.

11. The foam molding apparatus of claim 1, further comprising a foaming resin extrusion unit configured to temporarily store the foaming resin-critical solution supplied from the fixed mixing unit to extrude the foaming resin-critical solution into the molding unit.

* * * * *